United States Patent
Jun et al.

(10) Patent No.: US 9,172,935 B2
(45) Date of Patent: Oct. 27, 2015

(54) TERMINAL DEVICE CAPABLE OF MANAGING STORAGE CAPACITY AND MANAGEMENT METHOD THEREOF

(71) Applicant: SAMSUNG ELECTRONICS CO., LTD., Suwon-si (KR)

(72) Inventors: Young-kyun Jun, Suwon-si (KR); Jeong-rok Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 8 days.

(21) Appl. No.: 14/062,960

(22) Filed: Oct. 25, 2013

(65) Prior Publication Data

US 2014/0119713 A1 May 1, 2014

(30) Foreign Application Priority Data

Oct. 25, 2012 (KR) .......................... 10-2012-0119117

(51) Int. Cl.
*H04N 5/76* (2006.01)
*H04N 9/79* (2006.01)
*H04N 21/4335* (2011.01)
*H04N 21/442* (2011.01)
*H04N 21/433* (2011.01)
*H04N 21/458* (2011.01)
*H04N 21/472* (2011.01)
*H04N 21/485* (2011.01)

(52) U.S. Cl.
CPC ............. *H04N 9/79* (2013.01); *H04N 21/4334* (2013.01); *H04N 21/4335* (2013.01); *H04N 21/4424* (2013.01); *H04N 21/4583* (2013.01); *H04N 21/47214* (2013.01); *H04N 21/485* (2013.01)

(58) Field of Classification Search
USPC .................................................. 386/291–297
See application file for complete search history.

(56) References Cited

U.S. PATENT DOCUMENTS

| 7,280,662 B2 * | 10/2007 | Walker et al. .................. 380/255 |
| 2005/0183123 A1 * | 8/2005 | Lee et al. ......................... 725/47 |
| 2007/0201823 A1 * | 8/2007 | Kang .............................. 386/83 |

(Continued)

FOREIGN PATENT DOCUMENTS

| JP | 2006-140663 A | 6/2006 |
| JP | 2007-133640 A | 5/2007 |

(Continued)

OTHER PUBLICATIONS

Communications, dated Feb. 27, 2014, issued by the European Patent Office in counterpart European Application No. 13189479.2.

*Primary Examiner* — Nigar Chowdhury
(74) *Attorney, Agent, or Firm* — Sughrue Mion, PLLC (57) ABSTRACT

A terminal device capable of managing a storage capacity is provided. The terminal device includes a storage which stores a plurality of contents, a controller which selects candidates to be deleted according to a characteristic value from among the plurality of contents and generates a deletion candidate list, a display which displays the deletion candidate list, and an input which receives a user command to select content to be deleted from the deletion candidate list. A method of managing a storage capacity includes checking a storage capacity of a terminal device; in response to the storage capacity meeting a preset capacity condition, selecting candidates to be deleted from among a plurality of contents and generating a deletion candidate list; displaying the deletion candidate list; and deleting at least one content selected from the deletion candidate list.

18 Claims, 8 Drawing Sheets

| | Storage Date | File Size | Watched | Free | Edited | |
|---|---|---|---|---|---|---|
| File 1 | 5 days ago | 55GB | Yes | Yes | Yes | (8*0.2)+(6*1)+(5*0)+(4*1)+(4*0)=11.6 |
| File 2 | 1.5 month ago | 48GB | No | Yes | No | (8*0.8)+(6*0.8)+(5*1)+(4*1)+(4*1)=32.2 |

(56) References Cited

U.S. PATENT DOCUMENTS

2008/0260294 A1 10/2008 Ogata
2009/0113068 A1* 4/2009 Fujihira et al. ............. 709/231
2009/0142042 A1* 6/2009 Branam .................. 386/124

FOREIGN PATENT DOCUMENTS

| JP | 2008-176725 A | 7/2008 |
| JP | 2010-79950 A | 4/2010 |

* cited by examiner

|  | F1(Old) | F2(Size) | F3(Watched) | F4(Free) | F5(Edited) |
|---|---|---|---|---|---|
| Weight | 8 | 6 | 5 | 4 | 4 |

FIG. 4

|  | Score |
|---|---|
| One week ago | 0.2 |
| Two weeks ago | 0.4 |
| One month ago | 0.6 |
| One month ago | 0.8 |
| More than one month ago | 1.0 |

FIG. 5

|  | Score |
|---|---|
| 5GB | 0.2 |
| 10GB | 0.4 |
| 30GB | 0.6 |
| 50GB | 0.8 |
| 80GB | 1.0 |

FIG. 6

|  | Storage Date | File Size | Watched | Free | Edited |  |
|---|---|---|---|---|---|---|
| File 1 | 5 days ago | 55GB | Yes | Yes | Yes | (8*0.2)+(6*1)+(5*0)+(4*1)+(4*0)=11.6 |
| File 2 | 1.5 month ago | 48GB | No | Yes | No | (8*0.8)+(6*0.8)+(5*1)+(4*1)+(4*1)=32.2 |

TERMINAL DEVICE CAPABLE OF MANAGING STORAGE CAPACITY AND MANAGEMENT METHOD THEREOF

CROSS-REFERENCE TO RELATED APPLICATIONS

This application claims priority from Korean Patent Application No. 10-2012-0119117, filed on Oct. 25, 2012, in the Korean Intellectual Property Office, the disclosure of which is incorporated herein by reference, in its entirety.

BACKGROUND

1. Field

Apparatuses and methods consistent with exemplary embodiments relate to a terminal device and a management method thereof. More particularly, exemplary embodiments relate to a terminal device which allows a user to selectively manage a storage capacity of a memory, and a management method thereof.

2. Description of the Related Art

As electronic technology has developed, various types of terminal devices have developed and propagated. In addition, the memory capacities of terminal devices have increased.

Accordingly, terminal devices are capable of recording and storing a desired program or content and playing back the stored program or content at anytime. For example, a television having a personal video recording (PVR) may have already been stored and played back at home.

However, if a large memory capacity has not been managed properly, the memory capacity may become exhausted. Accordingly, when needed, data may not be recorded in the memory.

Therefore, when the user records desired content, the user has to frequently check both the remaining memory capacity before and/or during the recording. In particular, in the case of a scheduled recording, if the memory is exhausted during the recording, the recording may inevitably stop in a premature fashion.

SUMMARY

Exemplary embodiments may overcome the above disadvantages and other disadvantages not described above. Also, the exemplary embodiments are not required to overcome the disadvantages described above, and an exemplary embodiment may not overcome any of the problems described above.

The exemplary embodiments provide provides a terminal device which allows the user to properly manage a storage capacity of a memory using a deletion candidate list, and a management method thereof.

According to an aspect of the exemplary embodiments, a method of managing a terminal device includes checking a storage capacity of the terminal device. In response to the storage capacity meeting a preset capacity condition, selecting candidates to be deleted from among a plurality of contents and generating a deletion candidate list, displaying the deletion candidate list, and deleting at least one content selected from the deletion candidate list.

The storage capacity of the terminal device may be checked repeatedly whenever a preset period approaches. The management method may further include calculating a characteristic value of each content by giving a score according to a plurality of properties which each content has and multiplying the score by a preset weight according to the plurality of properties, determining a deletion candidate rating of the plurality of contents based on the characteristic value, and selecting a preset number of contents as the candidates to be deleted, based on the deletion candidate rating, and generating the deletion candidate list.

The plurality of properties may include at least one of content size, storage date, whether or not content has been watched, whether content is free, whether content has been edited and whether content is locked. The method of managing a storage device may further include rearranging the generated deletion candidate list according to a user designated property.

The storage capacity of the terminal device may be checked when at least one event occurs from among events in which a scheduled-recording function is set, an event in which the terminal device is turned on and initiated, an event in which recording starts, an event in which recording is in process during a preset time, and an event in which a storage element is connected to the terminal device.

The storage capacity condition may be an absolute criteria based on a storage capacity value within an entire storage capacity of the terminal device which has been set by a user, or may be a relative criteria based on a proportion of a storage capacity within the entire storage capacity of the terminal device, which is set by a user.

The management method may further include displaying a user interface window to set the storage capacity condition, wherein the capacity condition may be updated with a value adjusted through the user interface window.

According to another aspect of the exemplary embodiments, a terminal device may include a storage which stores a plurality of contents, a controller which checks a storage capacity of the storage, selects candidates to be deleted from among the plurality of contents in response to the storage capacity meeting a preset capacity condition, and generates a deletion candidate list, a display which displays the deletion candidate list, and an input which receives a user command to select at least one content to be deleted from the deletion candidate list, wherein the controller deletes from the storage the at least one content selected through the user input.

The controller may repeatedly check the storage capacity of the storage whenever a preset period approaches. The controller may calculate a characteristic value of each content by providing a score relating to a plurality of properties which each content has, and multiplying the score by a preset weight according to a plurality of properties, determine a deletion candidate rating of the plurality of contents based on the characteristic value, may select a preset number of contents as the candidates to be deleted based on the deletion candidate rating, and may generate the deletion candidate list.

The plurality of properties may include at least one of content size, storage date, whether or not content has been watched, whether content is free, whether content has been edited, and whether content is locked. The controller may rearrange the deletion candidate list according to a user designated property.

The controller may check the storage capacity of the storage when at least one event occurs from among an event in which a scheduled-recording function is set, an event in which the terminal device is turned on and initiated, an event in which recording starts, an event in which recording is in process during a preset time, and an event in which a storage element is connected to the terminal device. The capacity condition may be an absolute storage capacity criteria based on a storage capacity value within an entire storage capacity of the terminal device which is set by a user, or may be a relative criteria based on a user setting a proportion of storage capacity within the entire storage capacity of the terminal device. The display may display a user interface window to set the storage capacity condition, and the storage capacity condition may be updated with a value adjusted through the user interface window.

According to the diverse exemplary embodiments as described above, while recording content, the recording may not stop due to lack of recording space and pre-stored content may not be arbitrarily deleted. Consequently, recording space of the terminal device may be efficiently managed.

An exemplary embodiment may provide a method of managing a terminal device, the method including: checking a storage capacity of the terminal device; and in response to the storage capacity meeting a preset capacity condition, selecting candidates to be deleted from among a plurality of contents and generating a deletion candidate list. The storage capacity of the terminal device may be repeatedly checked whenever a preset period approaches.

An exemplary embodiment may further provide a terminal device including: a storage which stores a plurality of contents; a controller which checks a storage capacity of the storage, selects candidates to be deleted from among the plurality of contents in response to the storage capacity meeting a preset capacity condition, and generates a deletion candidate list; and an input which receives a command to select at least one content to be deleted from the deletion candidate list, wherein the controller deletes the selected content. The controller may repeatedly check the storage capacity of the storage whenever a preset period approaches.

Additional and/or other aspects and advantages will be set forth in part in the description which follows and, in part, will be obvious from the description, or may be learned by practice of the exemplary embodiments.

BRIEF DESCRIPTION OF THE DRAWING FIGURES

The above and/or other aspects of the exemplary embodiments will be more apparent with reference to the accompanying drawings, in which.

DETAILED DESCRIPTION OF THE EXEMPLARY EMBODIMENTS

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the invention with unnecessary detail.

Figure 1:
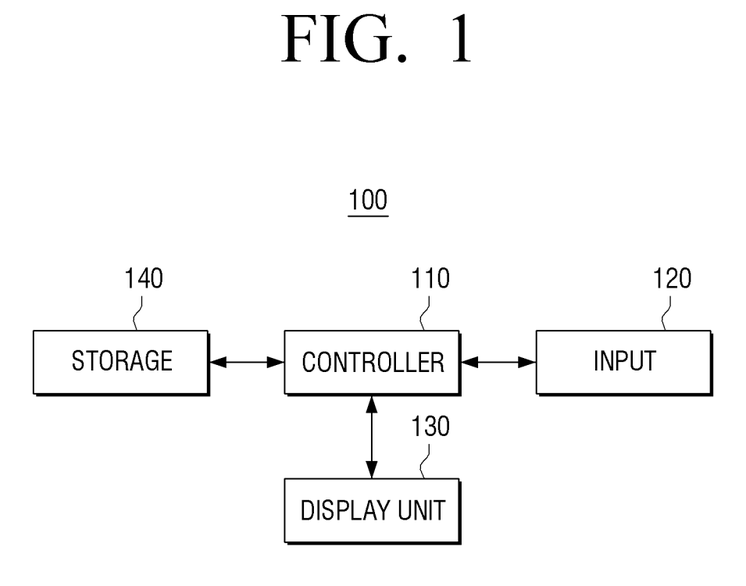
FIG. 1 is a block diagram illustrating a configuration of a terminal device consistent with an exemplary embodiment.

FIG. 1 is a block diagram illustrating a configuration of a terminal device 100 consistent with an exemplary embodiment. The terminal device 100 may be implemented by diverse types of electronic devices having storage means, such as televisions (TVs), cameras, mobile phones, laptop computers, personal computers (PCs), tablet PCs, personal digital assistants (PDAs), electronic picture frames, MP3 players, printers, multifunction peripherals, scanners and facsimiles.

As illustrated in FIG. 1, the terminal 100 may include a controller 110, an input 120, a display 130, and a storage 140.

The storage 140 stores diverse programs, data, and content which are used by the controller 110. The storage 140 may be an embedded memory such as a hard disk drive (HDD), or an external memory such as memory stick or memory card.

The input 120 receives diverse user commands. The input 120 may be implemented with buttons provided on a main body of the terminal 100, or may be implemented by a remote control signal receiver which receives a remote control signal from an external remote controller. The input 120 transmits an input user command to the controller 110.

The display 130 displays diverse information related to the terminal device 100. The display 130 displays a pop-up window for a deletion candidate list generated by the controller 110, or a pop-up window for the pre-stored entire content list, depending on the user's selection.

The controller 110 controls the overall operations of the terminal device 100 according to a user command. For example, in response to a content recording command being input, the controller 110 records the content at a designated content processing time. The recorded content may be stored in the storage 140.

The controller 110 manages a storage capacity by frequently checking the state of the terminal 100. More specifically, the controller 110 checks a storage capacity of the storage 140 and determines whether the storage capacity meets a preset capacity condition. In response to the storage capacity meeting a preset capacity condition, the controller 110 selects candidates to be deleted from among contents stored in the storage 140 and generates a deletion candidate list.

The controller 110 may check the storage capacity of the storage 140 according to preset periods or whenever a predetermined event occurs. The predetermined event may be an event in which a scheduled-recording function is set, an event in which the terminal 100 is turned on and initiated, an event in which recording starts, an event in which recording is in process during a preset time, or an event in which a storage element is connected to the terminal 100. In addition, the preset period may be modified by the user using the input 120.

As a result of checking the remaining capacity of the storage 140, in response to a storage capacity meeting the capacity condition preset by the user, the controller 110 determines that the remaining recording capacity is insufficient.

The storage capacity condition may be an absolute criteria of a storage capacity value set by the user from among the entire storage capacity of the terminal device 100, or may be a relative criteria of a storage capacity proportion set by the user from among the entire storage capacity of the terminal device 100.

The absolute storage criteria and the relative storage criteria may each be set for a used or usable storage capacity. For example, in an exemplary embodiment in which the absolute criteria is set for a usable storage capacity, in response to the entire storage capacity of the terminal device 100 being 50 GB and the user sets the absolute criteria to be less than 10 GB, the controller 110 determines that when the remaining capacity of the storage 140 is less than 10 GB, the capacity condition is met. Accordingly, the controller 110 determines that the remaining capacity of the recording space is insufficient.

To the contrary, in an exemplary embodiment in which the absolute storage criteria is set for a used storage capacity, when the entire storage capacity of the terminal device 100 is 50 GB, the user sets the absolute criteria to be more than 40 GB, as in the above example. The controller 110 determines that when the used storage capacity of the storage 140 is more than 40 GB, the capacity condition is met. Accordingly, the controller 110 determines that the remaining capacity of the recording space is insufficient.

On the other hand, the relative i criteria may indicate the remaining space, which is compared with the entire capacity of the storage 140. In response to the remaining space being less than a set proportion in comparison with the entire capacity of the storage 140, the controller 110 determines that a recording space is insufficient. For example, in response to the entire storage capacity of the storage 140 being 1 TB, the user may set a capacity condition by setting the remaining capacity to be less than 10% or setting the used capacity to be more than 90%. Accordingly, in response to the remaining capacity of the storage 140 being less than 10 GB which is 10% of 1 TB or the used capacity is more than 90 GB, the controller 110 determines that a recording space of the storage 140 is insufficient.

In response to a determination by controller 110 that the remaining capacity of the storage 140 is insufficient, the controller 110 gives pre-stored contents a weight and a score according to a plurality of properties, and generates a deletion candidate list in descending order of the result value. The method of giving contents a weight and a score according to properties will be described in greater detail with reference to FIG. 4.

The controller 110 displays the generated deletion candidate list on the display 130. In response to user selection to be deleted, the controller 110 deletes the selected content and thus secures a recording space. In addition, the controller 110 again determines whether a recording space is insufficient, and repeats the process described above so that the remaining capacity of the storage 140 may be secured.

Figure 2:
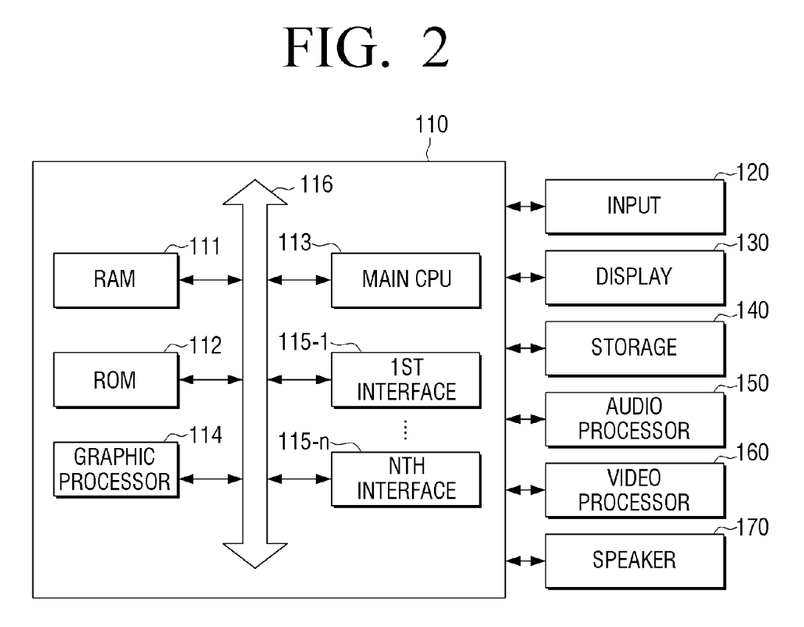
FIG. 2 is a block diagram illustrating an example of a more detailed configuration of the terminal device shown in FIG. 1.

FIG. 2 is a block diagram illustrating an example of a more detailed configuration of the terminal device 100 shown in FIG. 1.

As illustrated in FIG. 2, terminal device may include a controller 110, an input 120, a display 130, a storage 140, an audio processor 150, a video processor 160, and a speaker 170. Among the components shown in FIG. 2, detailed description of those which overlap the components shown in FIG. 1 is not repeated here.

The above operation of the controller 110 may be performed by a program stored in the storage 140. The storage 140 may store diverse data such as an operating system (OS) software module to drive the terminal device 100, all sorts of applications, data which are input or set while executing applications and contents.

The audio processor 150 processes audio data. The audio processor 150 may perform diverse processing such as decoding, amplification and noise filtering of audio data.

The video processor 160 processes video data. The video processor 160 may perform diverse image processing such as decoding, scaling, noise filtering, frame rate conversion and resolution conversion of video data.

The speaker 170 outputs various notification sounds and voice messages as well as audio data processed by the audio processor 150.

The controller 110 controls the overall operation of the terminal 100 using diverse programs stored in the storage 140. For example, the controller 110 may constitute and display an execution window by executing an application stored in the storage 140, and may play back content stored in the storage 140.

More specifically, the controller 110 may include a random-access memory (RAM) 111, a read-only memory (ROM) 112, a main central processor (CPU) (or central processor) 113, a graphic processor 114, $1^{st}$ to $n^{th}$ interfaces 115-1 to 115-n, and a bus 116.

The RAM 111, ROM 112, main CPU 113, graphic processor 114, and $1^{st}$ to $n^{th}$ interfaces 115-1 to 115-n may be connected to one another through the bus 116.

The $1^{st}$ to $n^{th}$ interfaces 115-1 to 115-n are connected to the above components. One of the interfaces may be a network interface which is connected to an external device through a network.

The main CPU 113 accesses the storage 140 and performs booting using the OS stored in the storage 140. In addition, the main CPU 113 performs various operations using diverse types of programs, contents and data which are stored in the storage 140.

The ROM 112 stores a set of commands for booting the system. In response to a turn-on command being input and power being supplied, the main CPU 113 copies the OS stored in the storage 140 to the RAM 111 according to the commands stored in the ROM 112, executes the OS and boots the system. In response to booting being complete, the main CPU 113 copies diverse application programs stored in the storage 140 to the RAM 111, executes the copied application program and performs diverse operations.

The main CPU 113 checks properties of contents stored in the storage 140. Consequently, the main CPU 113 sorts the contents based on at least one preset property from among the properties, and selects candidates to be deleted. The main CPU 113 provides information related to the selected candidates to the graphic processor 114.

The graphic processor 114 generates a window including diverse objects such as icons, images, and text, using a calculation module (not shown) and a renderer (not shown). The calculation module calculates property values such as coordinate values, shape, size and color to display the objects according to the layout of the window using a control command received from the input 120. The renderer generates a window of diverse layouts including the objects based on the calculated property values.

More specifically, the graphic processor 114 generates a deletion candidate list using the deletion candidate information received from the main CPU 113. The deletion candidate list may be generated in an on-screen display (OSD) form. The graphic processor 114 provides the deletion candidate list to a frame buffer (not shown) so that the deletion candidate list is added to an output frame to be displayed. The display 130 displays the output frame including the deletion candidate list based on the data recorded in the frame buffer.

FIG. 2 illustrates an example of a detailed configuration of the terminal device 100. Accordingly, according to an exemplary embodiment, some of the components shown in FIG. 2 may be omitted or modified, and any other components may be added.

FIGS. 3 to 6 illustrate a method of generating a deletion candidate list consistent with an exemplary embodiment.

The deletion candidate list is a list of contents which are recommended to the user so as to be deleted from among a plurality of contents, according to preset criteria.

The deletion candidate list is written in the order of a characteristic value which is obtained by giving a score to each of a plurality of properties and multiplying the score by a weight set by the user.

The characteristic value becomes a criteria for determining a deletion candidate rating of contents, and is obtained by multiplying a score of each property by a weight. The plurality of properties may include content size, storage date, whether the content has been watched, whether the content is free, whether the content has been edited by the user, and the like.

Accordingly, in response to the content being large in size, was stored long ago, has been played back multiple times, and has not been edited, the content may be rated in a higher rating on the deletion candidate list.

Figure 3:
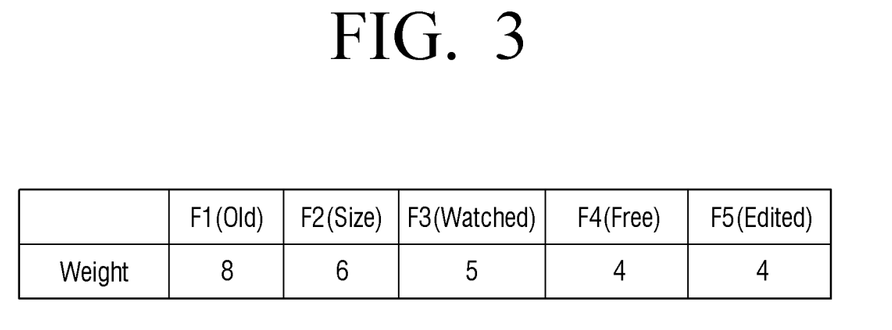
FIGS. 3 to 6 illustrate a method of using content properties for determining a deletion candidate rating.

Content which a user wants to be preferentially deleted may vary according to the user. Accordingly, the user may modify a weight of each property. In response to the user wishing to preferentially delete large content, the user may give the highest weight to a property relating to content size. In response to the user wishing to preferentially delete old content, the user may give the highest weight to the storage date.

FIG. 3 illustrates different weights which are given to a plurality of properties according to the exemplary embodiments. In FIG. 3, the user gives the highest weight to storage date. Accordingly, an inference can be made that the user wishes to preferentially delete old content. In addition, in FIG. 3, the user gives the lowest weight to whether the content is free and whether the content has been edited by the user. Accordingly, it can be inferred that these properties are regarded as unimportant.

However, this is merely an exemplary embodiment. Accordingly, the above properties may include any other properties or may be replaced, and the weight given to each property may vary.

Figure 4:
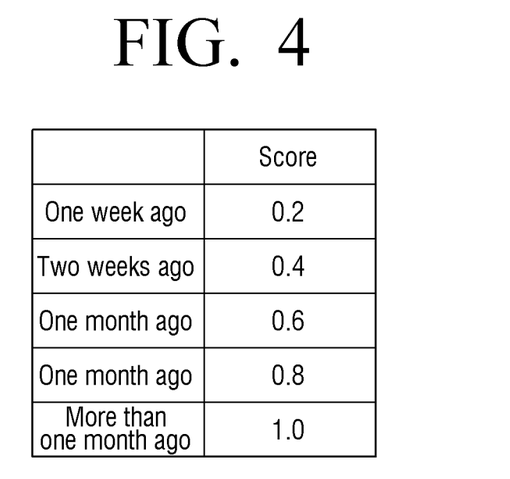
Figure 5:
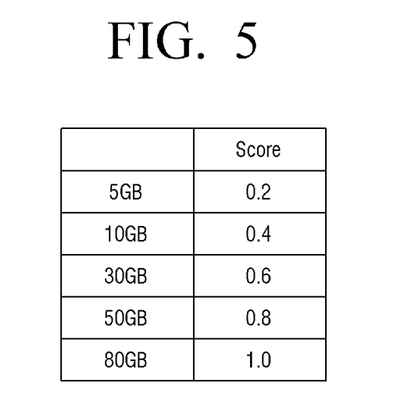

FIGS. 4 and 5 illustrate scores which are given to contents according to a plurality of properties consistent with an exemplary embodiment. FIG. 4 illustrates scores which are given according to storage date, and FIG. 5 illustrates scores which are given according to content size.

As described above, in response to content being large in size and having been stored long ago, the content is given a higher score. Thus, the content may be rated in a higher rating on the deletion candidate list.

Figure 6:
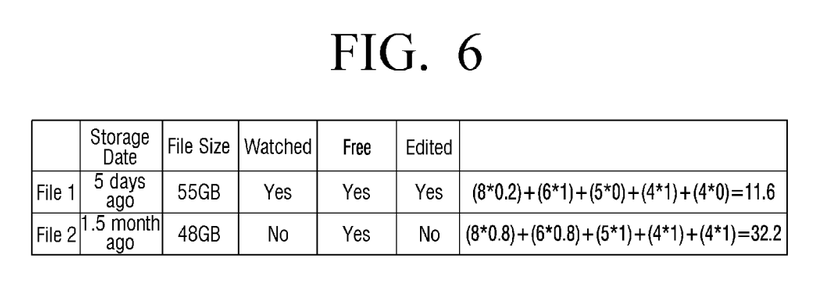

FIG. 6 illustrates a process of calculating a characteristic value obtained by multiplying a score given according to each property by a weight preset by the user.

In the case of File 1, a weight for storage date set by the user is 8 as illustrated in FIG. 3, and since the storage date is 5 ago, a score of 0.2 is given as illustrated in FIG. 4. Accordingly, a characteristic value of 8*0.2=1.6 is given to File 1. In the same manner, in response to the characteristic values for content size, whether the content has been watched, whether the content is free and whether the content has been edited by the user are all added, 11.6 is given to File 1. In the case of File 2, a score for storage date is given 0.8 as illustrated in FIG. 4, and a weight for storage date is 8 as illustrated in FIG. 3. Accordingly, a characteristic value of 0.8*8=6.4 is given to File 2. In the same manner, in response to the characteristic values for content size, whether the content has been watched, whether the content is free and whether the content has been edited by the user are all added, 32.2 is given to File 2.

Accordingly, in a deletion candidate list, File 2 having a higher total characteristic value is rated as a higher candidate than File 1.

However, the above exemplary embodiment is merely an example illustrating a method for calculating a characteristic value. Accordingly, any other properties may be added, and a deletion candidate list may be generated according to characteristic values obtained by giving scores to a plurality of properties in a different manner.

Figure 7:
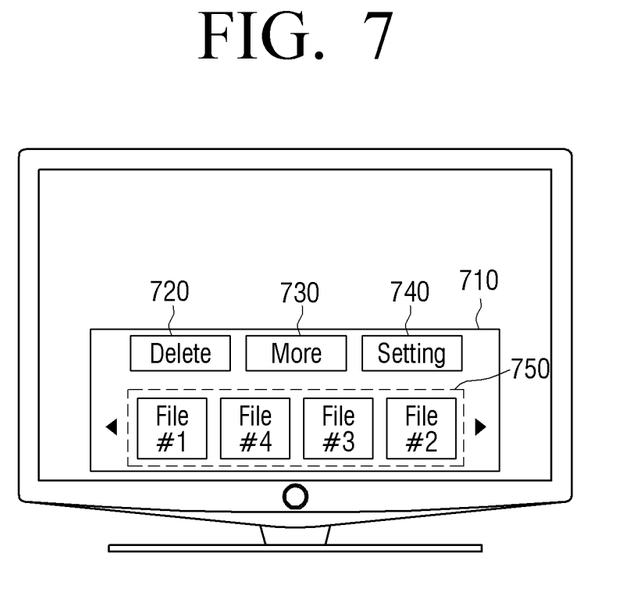
FIG. 7 illustrates a pop-up window for a deletion candidate list consistent with an exemplary embodiment.

FIG. 7 illustrates a pop-up window 710 for a deletion candidate list consistent with an exemplary embodiment.

In response to the terminal device 100 starting recording or the controller 110 determining that a storage capacity of the storage 140 is insufficient, the controller 110 displays a deletion candidate list pop-up window 710 which is generated based on total characteristic values described with reference to FIGS. 3 to 6.

According to an exemplary embodiment, the deletion candidate list pop-up window 710 is displayed on a lower portion of the display 130 of the terminal device 100. A file list 750 is arranged on a lower portion of the deletion candidate list pop-up window 710 from left to right in descending order of characteristic values.

In other words, in the file list 750 of FIG. 7, File #1 is content having the highest characteristic value, and File #4, File #3, and File #2 have lower characteristic values in descending order.

The number of contents displayed on the file list 750 may be modified by the user. For example, in response to the user setting the number of contents displayed on the file list 750 to become "3" using the input 120, the top three contents having the highest characteristic values are displayed on the file list 750. In response to the user changing the number of contents displayed on the file list 750, the changed numbers of contents are displayed.

In response to the user selecting content to be deleted from the file list 750 using the input 120 and the user pressing "Delete" 720 on a higher portion of the deletion candidate list pop-up window 710, the selected content is deleted in the storage 140 so that the storage 140 may secure more space.

"More" 730 and "Setting" 740 of the deletion candidate list pop-up window 710 are described in detail with reference to FIGS. 8 and 9.

Figure 8:
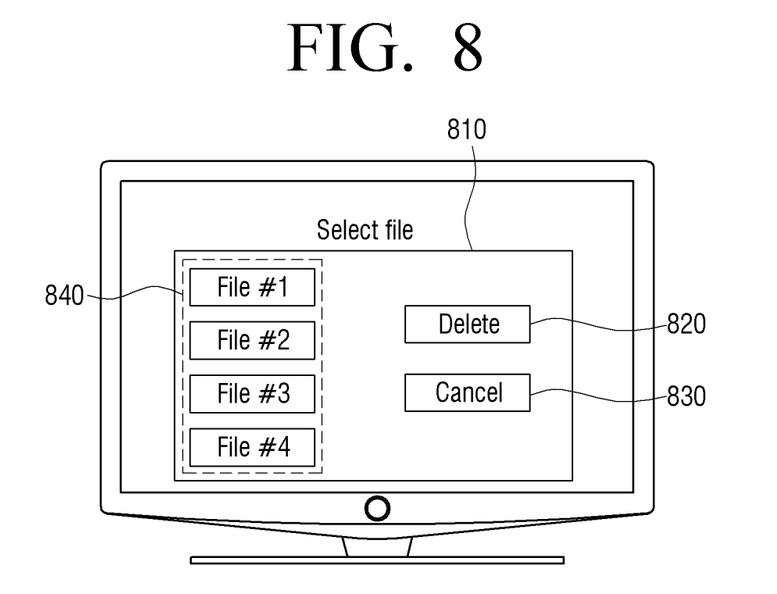
FIG. 8 illustrates a method of selectively deleting content from an entire content list.

FIG. 8 illustrates a method of displaying an entire content list and selectively deleting content from the entire content list, according to an exemplary embodiment.

In response to a storage capacity of the terminal device 100 being insufficient, a deletion candidate list which is recommended based on characteristic values of a plurality of properties is displayed. However, the user may want to check a list of the entire contents stored in the storage 140.

In this case, in response to the user selecting "More" 730 on the deletion candidate list pop-up window 710, a pop-up window 810 for an entire content list stored in the storage 140 is displayed. Accordingly, the user may check the entire content list 840, determine what content is unnecessary, and delete the content by selecting the content from the entire content list 840 and pressing "Delete" 820 using the input 120.

In response to a user pressing "Cancel" 830 on the entire content list pop-up window 810, the user may return to the deletion candidate list pop-up window 710.

Figure 9:
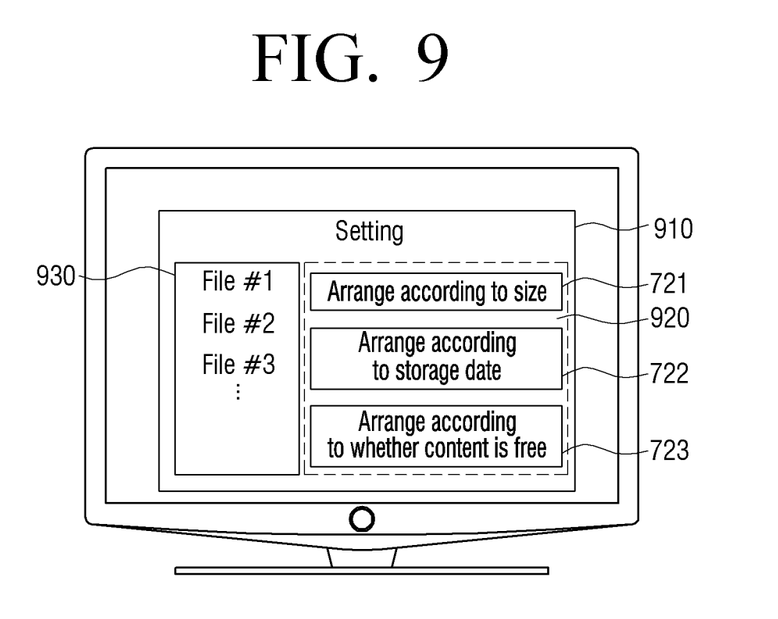
FIG. 9 illustrates a method of arranging contents displayed on the deletion candidate list according to a property designated by the user.

FIG. 9 illustrates a method of arranging contents displayed on the deletion candidate list according to a property designated by the user according to an exemplary embodiment.

For the deletion candidate list which is recommended based on characteristic values of a plurality of properties, the user may rearrange the list according to a desired property. For example, in response to the user wishing to rearrange the contents on the deletion candidate list according to storage date or content size, the user may press "Setting" 740 on the deletion candidate list 710 so that a pop-up window 910 for rearrangement according to a desired property may be displayed.

On a right portion of the rearrangement pop-up window 910, a property selection area 920 is positioned so that the user may select a property. On a left portion, a content display area 930 is positioned so that contents may be rearranged and displayed, according to a property selected by the user.

For example, in response to the user wishing to delete the oldest content from the deletion candidate list, the user selects "Setting" 740 on the deletion candidate list pop-up window 710. In response to the rearrangement pop-up window 910 being displayed, the user selects "Arrange according to storage date" on the property selection area 920 so that the oldest content may be selected and deleted.

This exemplary embodiment is merely an example for arranging contents according to a particular property. Accordingly, the property selection area 920 may include any other properties. Further, contents may be rearranged by combination of a plurality of properties.

Figure 10:
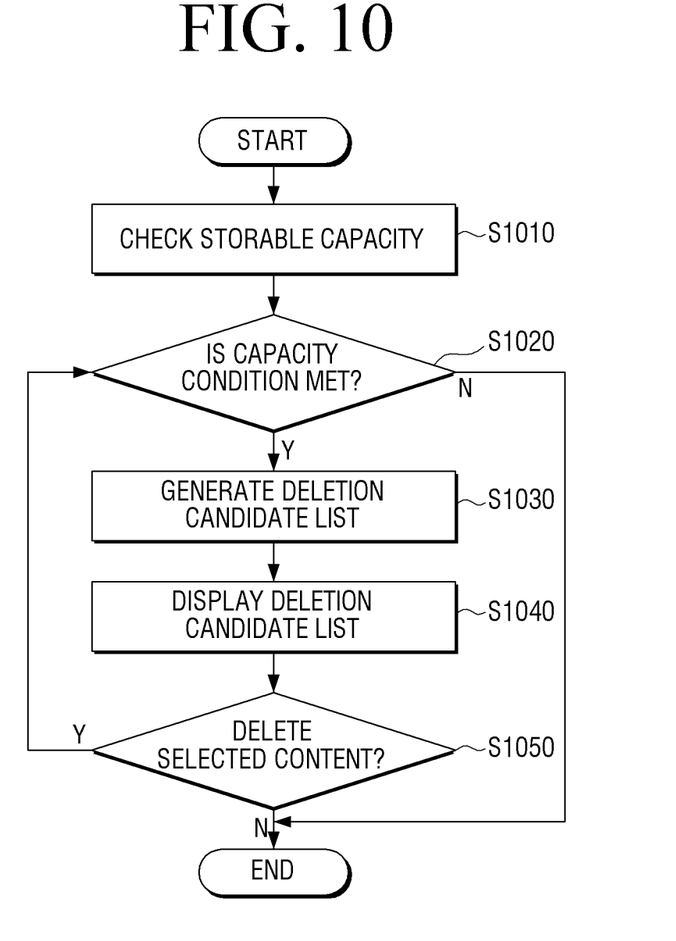
FIG. 10 is a flow chart illustrating a method of managing a memory of a terminal device consistent with an exemplary embodiment.

FIG. 10 is a flow chart illustrating a method of managing a memory terminal device, consistent with an exemplary embodiment.

With reference to FIG. 10, in operation S1010, when a period preset by the user approaches or a predetermined event occurs, a storage capacity of the terminal device is repeatedly checked.

In operation S1020, a determination is made as to whether an absolute criteria or relative criteria for a capacity condition is met. The absolute criteria indicates an absolute value of a used storage capacity or usable storage capacity, which has been preset by the user. The relative criteria indicates a proportion, which is preset by the user, of a used storage capacity or of a usable storage capacity in comparison with the entire storage capacity of the memory of the terminal device.

In operation of S1030, in response to the capacity condition being met, a deletion candidate list is generated in descending order of the characteristic value which is obtained by giving a score to each of a plurality of properties and multiplying the score by a weight which has been preset by the user.

In operation S1040, the deletion candidate list is displayed in pop-up form, and in operation S1050, the user deletes unnecessary content so that additional storage capacity of memory may be secured.

Figure 11:
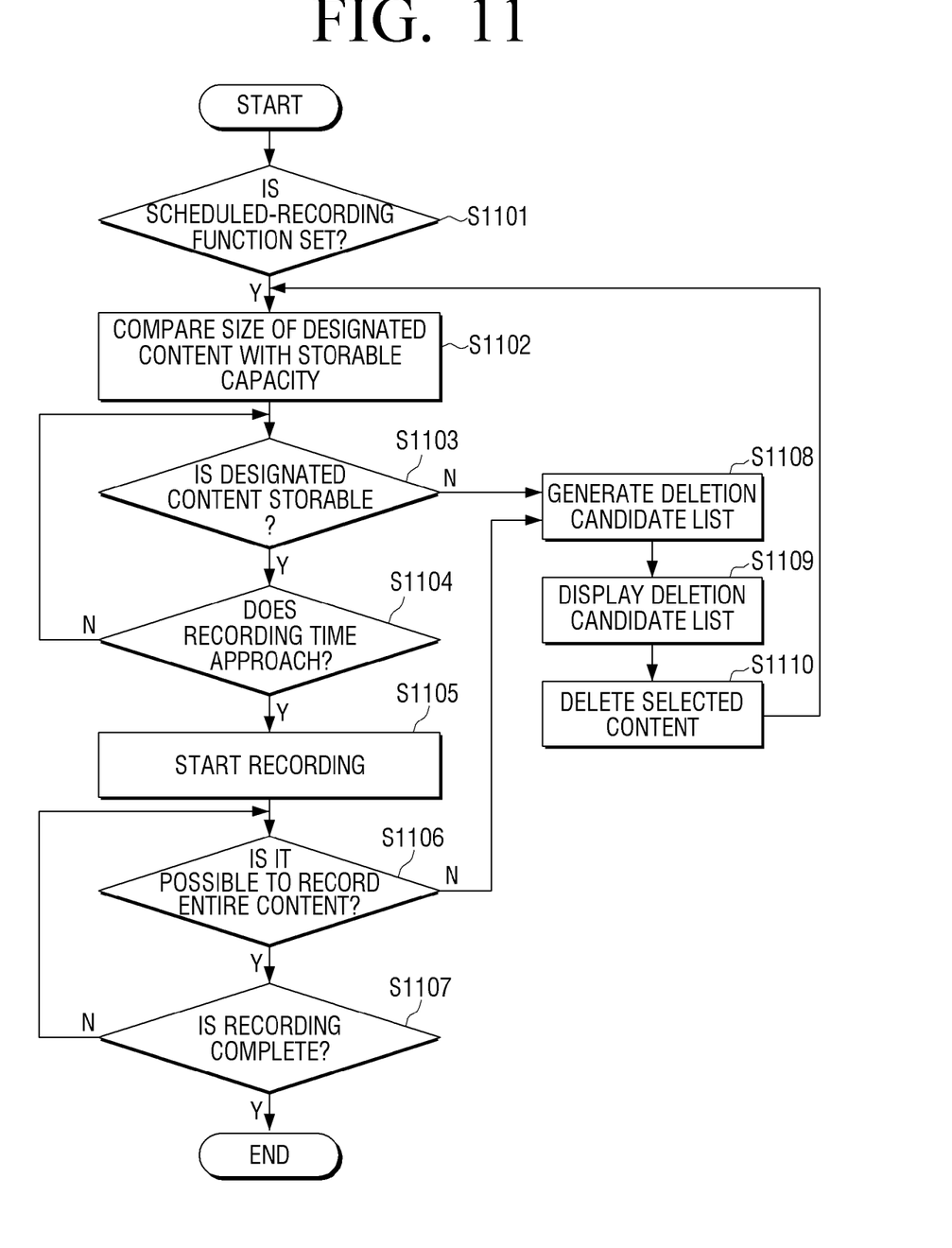
FIG. 11 is a more detailed flow chart illustrating a memory management method of managing a memory terminal device consistent with an exemplary embodiment.

FIG. 11 is a more detailed flow chart illustrating a method of managing capacity of a storage device, consistent with another exemplary embodiment.

With reference to FIG. 11, a method of managing capacity of a storage device consistent with another exemplary embodiment may include an event, in which a scheduled-recording function is set, occurring in operation S1101, comparing size of the content to be recorded with a storage capacity in operation S1102, determining whether the content to be recorded is storage in operation S1103, determining whether a scheduled time approaches in operation S1104, starting recording in operation S1105, determining whether or not it is possible to record the entire content during the recording in operation S1106, determining whether the recording is complete in operation S1107, generating a deletion candidate list in operation S1108, displaying the deletion candidate list in operation S1109, and deleting a selected content in operation S1110.

In operation S1101 of setting the scheduled-recording function, the user inputs a command to schedule recording of content to the storage of the terminal device. More specifically, the user may schedule recording by designating desired content or by inputting a starting time and ending time of desired content.

In operation S1102 of comparing size of the content to be recorded with a storage capacity, the controller 110 determines whether the designated content may be stored by estimating the size of the designated content and comparing the size with the remaining capacity of the storage 140.

In response to the remaining capacity of the storage 140 being insufficient in operation S1103, the controller 110 generates a deletion candidate list in operation S1108 and displays the deletion candidate list on the display 140 in operation S1109. In response to the user deleting content in operation S1110, storage space is secured and operation S1102 is repeated.

In response to the remaining capacity of the storage 140 being sufficient in operation S1103, a determination is frequently made as to whether the designated content is storage until recording starts in operation S1104, and the designated content starts being recorded at a designated time in operation S1105.

In operation S1106, the remaining capacity is frequently checked during the recording. In response to the remaining capacity being insufficient, operations S1108 to S1110 are repeated. In operation S1107, a determination is made as to whether recording is complete. In response to recording not being complete, the remaining capacity is checked frequently throughout the recording according to operation S1106.

A method of managing a memory of a terminal device consistent with diverse exemplary embodiments may be implemented with a program code, may be stored in a non-transitory computer readable storage medium, and may be provided to servers or devices.

A non-transitory computer readable storage medium indicates a medium which does not store data temporarily, such as registers, cashes, and memories, but stores data semi-permanently and is readable using devices. More specifically, the above diverse applications or programs may be stored and provided in a non-transitory computer readable storage medium, such as a compact disk (CD), digital versatile disk (DVD), hard disk, Blu-ray disk, universal serial bus (USB), memory card, and read-only memory (ROM).

The foregoing exemplary embodiments and advantages are merely exemplary and are not to be construed as limiting the present invention. The present teachings can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of managing a display device, the method comprising:
   checking a storage capacity of the display device;
   in response to the storage capacity meeting a preset capacity condition, calculating a characteristic value of each of a plurality of contents by giving a score according to a plurality of properties which each content has and multiplying the score by a preset weight according to a plurality of properties;

determining deletion candidate contents as candidates to be deleted from among the plurality of contents based on the calculated characteristic value;

displaying the deletion candidate contents;

receiving a user command to select at least one content to be deleted from the deletion candidate contents; and deleting at least one content selected from the deletion candidate contents.

2. The management method according to claim 1, wherein the storage capacity of the display device is repeatedly checked whenever a preset period approaches.

3. The management method according to claim 1, wherein the determining the deletion candidate contents comprises:

determining a deletion candidate rating of the plurality of contents based on the characteristic value; and selecting a preset number of contents as the candidates to be deleted from among the plurality of contents based on the deletion candidate rating in response to the storage capacity meeting a preset capacity condition, and generating a deletion candidate list, wherein the displaying the deletion candidate contents comprises displaying the generated deletion candidate list.

4. The management method according to claim 3, wherein the plurality of properties comprises at least one of content size, storage date, whether content has been watched, whether content is free, whether content has been edited and whether content is locked.

5. The management method according to claim 3, further comprising:

rearranging the generated deletion candidate list according to a property designated by a user.

6. The management method according to claim 1, wherein the storage capacity of the display device is checked when at least one event occurs from among an event in which a scheduled-recording function is set, an event in which the display device is turned on and initiated, an event in which recording starts, an event in which recording is in process during a preset time, and an event in which a storage element is connected to the display device.

7. The management method according to claim 1, wherein the capacity condition is an absolute criteria based on a user setting a storage capacity value within an entire storage capacity of the display device, or the capacity condition is a relative criteria based on a user setting a storage capacity proportion within the entire storage capacity of the display device.

8. The management method according to claim 1, further comprising:

displaying a user interface window to set the capacity condition, wherein the capacity condition is updated with a value adjusted through the user interface window.

9. The management method according to claim 1, wherein the preset weight is modified based on a user command.

10. A display device comprising:

a display;

a storage which stores a plurality of contents;

a controller which checks a storage capacity of the storage, in response to the storage capacity fleeting a preset capacity condition, calculates a characteristic value of each of a plurality of contents by giving a score according to a plurality of properties which each content has and multiplying the score by a preset weight according to a plurality of properties, determines deletion candidate selects contents as candidates to be deleted from among the plurality of contents based on the calculated characteristic value controls the display to display the determined deletion candidate contents; and an input which receives a user command to select at least one content to be deleted from the deletion candidate contents, wherein the controller deletes from the storage the at least one content selected through the input.

11. The display device according to claim 10, wherein the controller repeatedly checks the storage capacity of the storage whenever a preset period approaches.

12. The terminal device according to claim 10, wherein the controller determines the deletion candidate by determining a deletion candidate rating of the plurality of contents, based on the characteristic value and selecting a preset number of contents as the candidates to be deleted from among the plurality of contents based on the deletion candidate rating in response to the storage capacity meeting a preset capacity condition, and generates a deletion candidate list.

13. The display device according to claim 12, wherein the plurality of properties comprises at least one of content size, storage date, whether content has been watched, whether content is free, whether content has been edited and whether content is locked.

14. The display device according to claim 12, wherein the controller rearranges the deletion candidate list according to a property designated by a user.

15. The display device according to claim 10, wherein the controller checks the storage capacity of the storage when at least one event occurs from among an event in which a scheduled-recording function is set, an event in which the display device is turned on and initiated, an event in which recording starts, an event in which recording is in process during a preset time and an event in which a storage element is connected to the display device.

16. The display device according to claim 10, wherein the storage capacity condition is an absolute criteria based on which a user sets a storage capacity value within an entire storage capacity of the display device, or is a relative storage criteria based on a user setting a storage capacity proportion within the entire storage capacity of the display device.

17. The display device according to claim 10, wherein the display displays a user interface window to set the capacity condition, and the capacity condition is updated with a value adjusted through the user interface window.

18. The display device according to claim 10, wherein the preset weight is modified based on a user command received via the input.

* * * * *